(12) United States Patent
Hale et al.

(10) Patent No.: US 7,413,145 B2
(45) Date of Patent: Aug. 19, 2008

(54) AERIAL DELIVERY SYSTEM

(75) Inventors: John C. Hale, Southlake, TX (US);
Christopher B. Harris, Amity, OR (US); Daniel A. Kottman, Huntington Beach, CA (US)

(73) Assignee: Evergreen International Aviation, Inc., McMinneville, OR (US)

( * ) Notice: Subject to any disclaimer, the term of this patent is extended or adjusted under 35 U.S.C. 154(b) by 264 days.

(21) Appl. No.: 10/867,571

(22) Filed: Jun. 14, 2004

(65) Prior Publication Data

US 2005/0017131 A1 Jan. 27, 2005

Related U.S. Application Data

(60) Provisional application No. 60/571,819, filed on May 17, 2004, provisional application No. 60/477,829, filed on Jun. 11, 2003.

(51) Int. Cl.
*B64D 1/00* (2006.01)
(52) U.S. Cl. .................. 244/136; 244/118.1; 239/171; 137/899.2
(58) Field of Classification Search ............... 244/136, 244/118.1, 118.2, 137, 137.4; 239/171; 137/899.2
See application file for complete search history.

(56) References Cited

U.S. PATENT DOCUMENTS

| 1,911,431 | A |   | 5/1933  | Cawley |         |
|-----------|---|---|---------|--------|---------|
| 2,242,705 | A |   | 5/1941  | Gordon |         |
| 2,493,017 | A |   | 3/1950  | Nutter |         |
| 2,926,688 | A | * | 3/1960  | Muma et al. | ............... 137/263 |
| 3,547,000 | A |   | 12/1970 | Haberkom et al. |  |
| 3,995,328 | A | * | 12/1976 | Carolan et al. | ................. 4/316 |
| 4,172,499 | A | * | 10/1979 | Richardson et al. | ........... 169/53 |
| 4,202,061 | A | * | 5/1980  | Waters | .......................... 4/317 |
| 4,208,949 | A | * | 6/1980  | Boilsen | .................... 89/1.801 |
| 5,261,440 | A | * | 11/1993 | Frank | ......................... 137/209 |
| 5,655,732 | A | * | 8/1997  | Frank | ......................... 244/1 R |
| 5,769,124 | A | * | 6/1998  | Ehrhardt | ............... 137/625.47 |
| 6,622,966 | B1 |  | 9/2003  | McConnel, Sr. |  |
| 2004/0016848 | A1 | * | 1/2004 | Jakubowski et al. | ..... 244/137.4 |

* cited by examiner

*Primary Examiner*—Michael J. Carone
*Assistant Examiner*—Benjamin P Lee
(74) *Attorney, Agent, or Firm*—Brian L. Johnson; George C. Rondeau, Jr.; Davis Wright Tremaine LLP (57) ABSTRACT

A method and apparatus for aerial fire suppression utilizing a potable fire retardant chemical dispensing system, readily adaptable, without extensive aircraft modification, to various makes of aircraft, for dispensing current types of forest and range fire fighting chemicals. The aerial delivery system is self contained and reusable. It enables cargo/utility aircraft to carry and dump a load, under control. The aerial delivery system is capable of attachment at the wing box, pressurized delivery from the nozzles, and nozzles directed straight downward.

5 Claims, 6 Drawing Sheets

AERIAL DELIVERY SYSTEM

BACKGROUND OF THE INVENTION

1. Field of the Invention

The present invention is directed to an aerial delivery system. In particular, the invention is directed to an aerial delivery system capable of ejecting material in a downward direction from the aircraft.

2. Description of the Related Art

Aerial delivery systems are used to carry and dump, under control, loads of water, or other fire-retardants, onto a forest fire beneath. In addition, other aerial delivery systems are used to carry and dump fluids or other materials on to objects and/or the ground below the aircraft such as for decontamination of an area due to a chemical spill or attack, oil spills, or for soil stabilization. Unfortunately, conventional aerial delivery systems lack capability in delivering desired fluids or other materials to the ground in sufficiently high densities and/or require undesirably low flying altitudes for delivery.

BRIEF SUMMARY OF THE INVENTION

The present invention is directed towards an aerial delivery system and a method of using the aerial delivery system.

In one embodiment, the aerial delivery system is capable of association with an aircraft and includes an aboard area and an outer area of the aircraft; an air accumulator associated with a plurality of tanks, the air accumulator located in the aboard area of the aircraft, the tanks capable of containing a material and/or fluid, the air accumulator capable of propelling the material and/or fluid contained in the tanks; a dump manifold associated with the tanks; and a dump valve, the dump valve associated with the dump manifold, wherein the fluid and/or material is directed by pressure in the accumulator and is propelled through the dump valve downward from the aboard area of the aircraft.

In one aspect of the aerial delivery system, the fluid and/or material is selected from at least one of a water, gel, powder, decontamination compound, weather modification compound, oil spill treatment compound, and a firefighting compound. In another aspect, the aerial delivery system is capable of association with an airplane, helicopter, and balloon.

In another embodiment, the aerial delivery system is capable of use with an aircraft having an air accumulator, the air accumulator capable of holding high-pressure air; a high pressure line; at least a material holding tank connected to the air accumulator by the high pressure line, the material holding tank having a forward end and an aft end; a high pressure regulator associated with the air accumulator, wherein the high pressure regulator allows the air accumulator to hold large amounts of air at high pressures so low and constant air pressure can be delivered to the material holding tank; at least a separation valve associated with the aft end of the material holding tank; a dump manifold associated with the material holding tank; and a dump outlet associated with the dump manifold, the dump outlets located behind the aircraft wing box, wherein the fluid held within the material holding tank is capable of exiting the system from the dump outlets under propulsion from high pressure air from the air accumulator.

In one aspect, the aerial delivery system further includes a faring housed over the dump outlet. In yet another aspect, the material holding tank is a high pressure vessel. In another aspect, the aerial delivery system includes a second material holding tank joined to form a branching T joint or a branching Y joint. The material holding tank may be made of steel. In one aspect, the separation valve may be a butterfly valve. The separation valve may be located on each side of the branching T joint or branching Y joint. The dump outlet may be a chute or nozzle. In another aspect, the aerial delivery system further includes a drop controller. In one aspect, the material holding tanks run generally longitudinally with the aircraft. The aircraft may be a Boeing 747.

One advantage of the aerial delivery system, because of the outlets pointing downward rather than rearward, the discharged materials do not flow back into the aircraft and into the cargo bed.

The invention will best be understood by reference to the following detailed description of the preferred embodiment, taken in conjunction with the accompanying drawings. The discussion below is descriptive, illustrative and exemplary and is not to be taken as limiting the scope defined by any appended claims.

DETAILED DESCRIPTION OF THE INVENTION

The aerial delivery system 1 is self-contained and reusable and enables aircraft, such as but not limited to cargo/utility aircraft, to carry and dump a load, under control. One example of an aircraft among many, is a Boeing 747. The aerial delivery system 1 is attached at a reinforced part of the fuselage 3 of the aircraft. This system 1 is pressurized and allows a uniform and narrow material drop from high altitudes and a reduction in the amount of time material is suspended in the air. It is capable of delivering pressurized fluid from outlets 5 directed straight downward. By "downward," it is envisioned that the aircraft with which the aerial delivery system 1 is associated will have a body 10 having a bottom side 15, which is generally the closest side of the fuselage 3 to the ground when the aircraft is being support on the ground by its wheel system. The pressurized fluid or other material delivered from the outlets 5 is directed straight down and exiting the body 10 at the bottom side 15 with the material moving further downward away from the body and the bottom side. In one aspect, the aerial delivery system 1 is attached to a Boeing 747 aircraft. The aerial delivery system 1 allows the Boeing 747 to fly at higher altitudes and still drop a load. The contents are shot to the ground by the aerial fluid delivery system, not just away from the aircraft and its turbulence, as in prior art systems, thus better ground coverage is achieved.

The aerial delivery system 1 can be used to fight fires, chemical decontamination, weather modification and to treat oil spill contamination, among other uses. The aerial delivery system 1 may also be referred to as a "fire bomber." The aerial delivery system 1 is capable of carrying and dropping a load at about 2,500 feet. The aerial delivery system 1 can drop about 25,000 gallons of fluid in approximately 5 seconds. The quantity of material delivered by the aerial delivery system 1 and duration of the aerial delivery system deliveries will be controllable by the pilot at any flight regime the aircraft is capable of operating in (i.e., altitude, airspeed, pressurized or unpressurized). The system's load has the ability to be dispersed in segmented drops or at one time.

Figure 1:
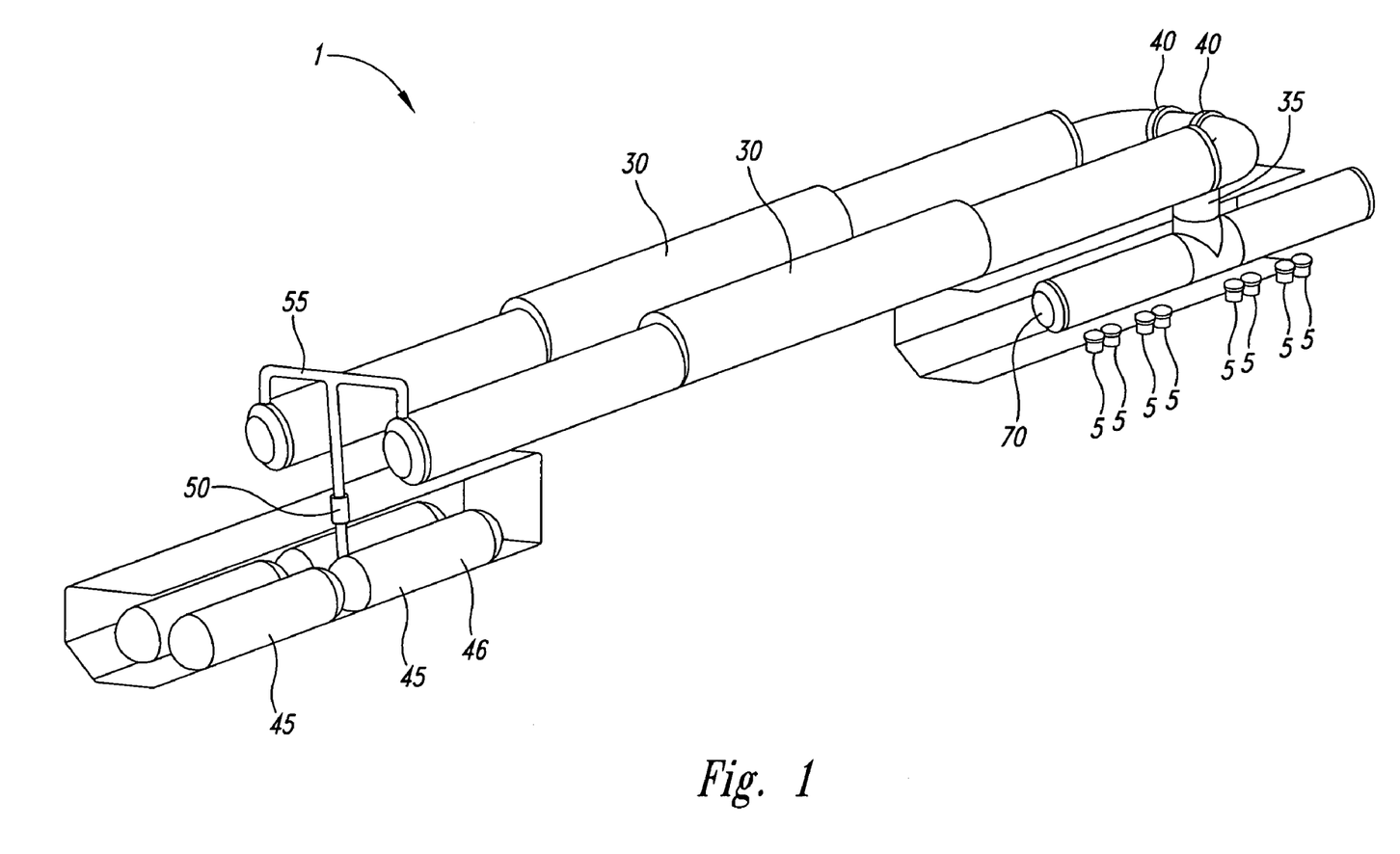
FIG. 1 is a perspective view of one embodiment of the aerial delivery system.
Figure 2:
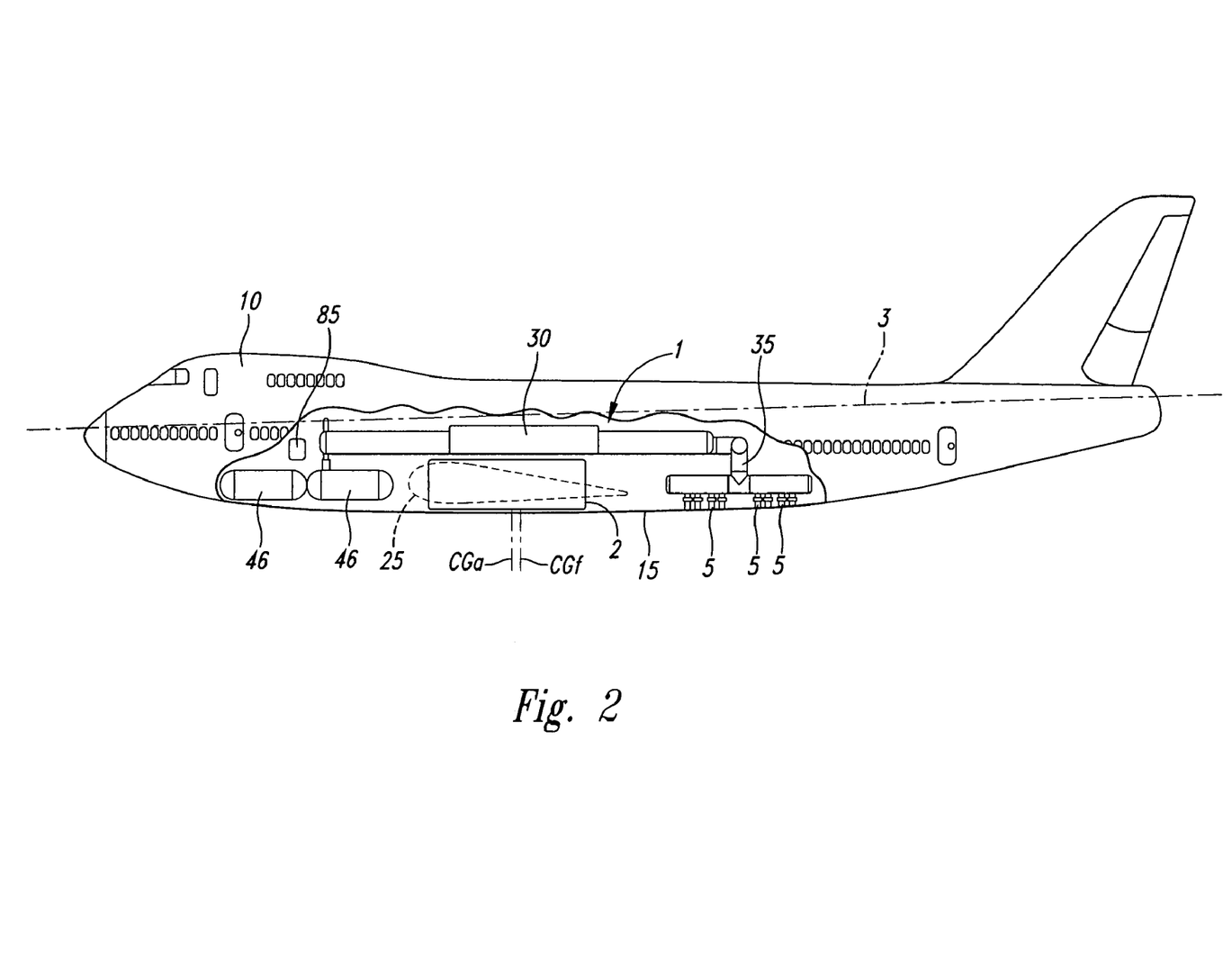
FIG. 2 is a side view of one embodiment of the aerial delivery system in conjunction with an aircraft.
Figure 3:
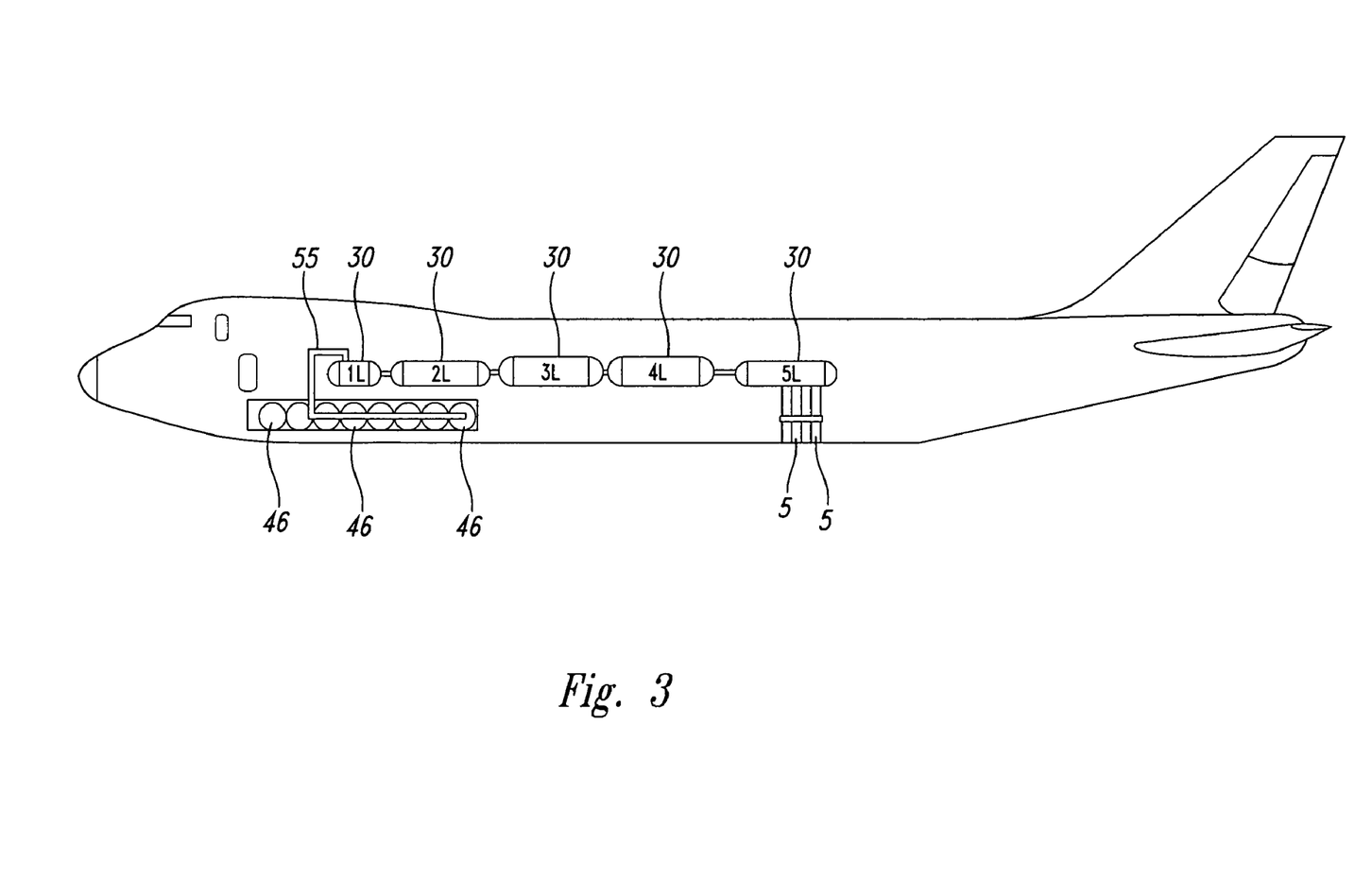
FIG. 3 is a side view of another embodiment of the aerial fluid delivery system in conjunction with an aircraft.
Figure 4:
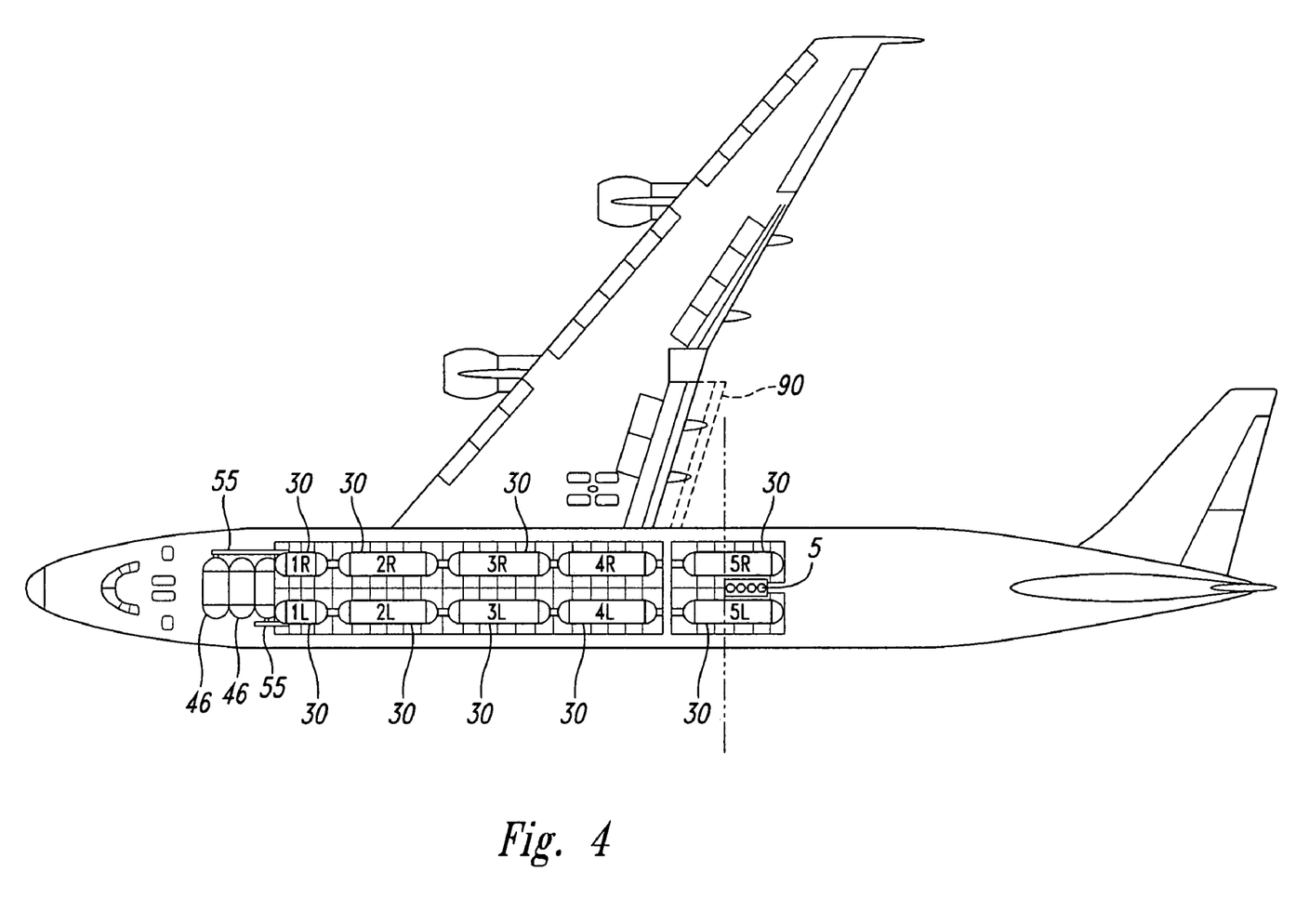
FIG. 4 is a top view of the embodiment of FIG. 3.
Figure 5:
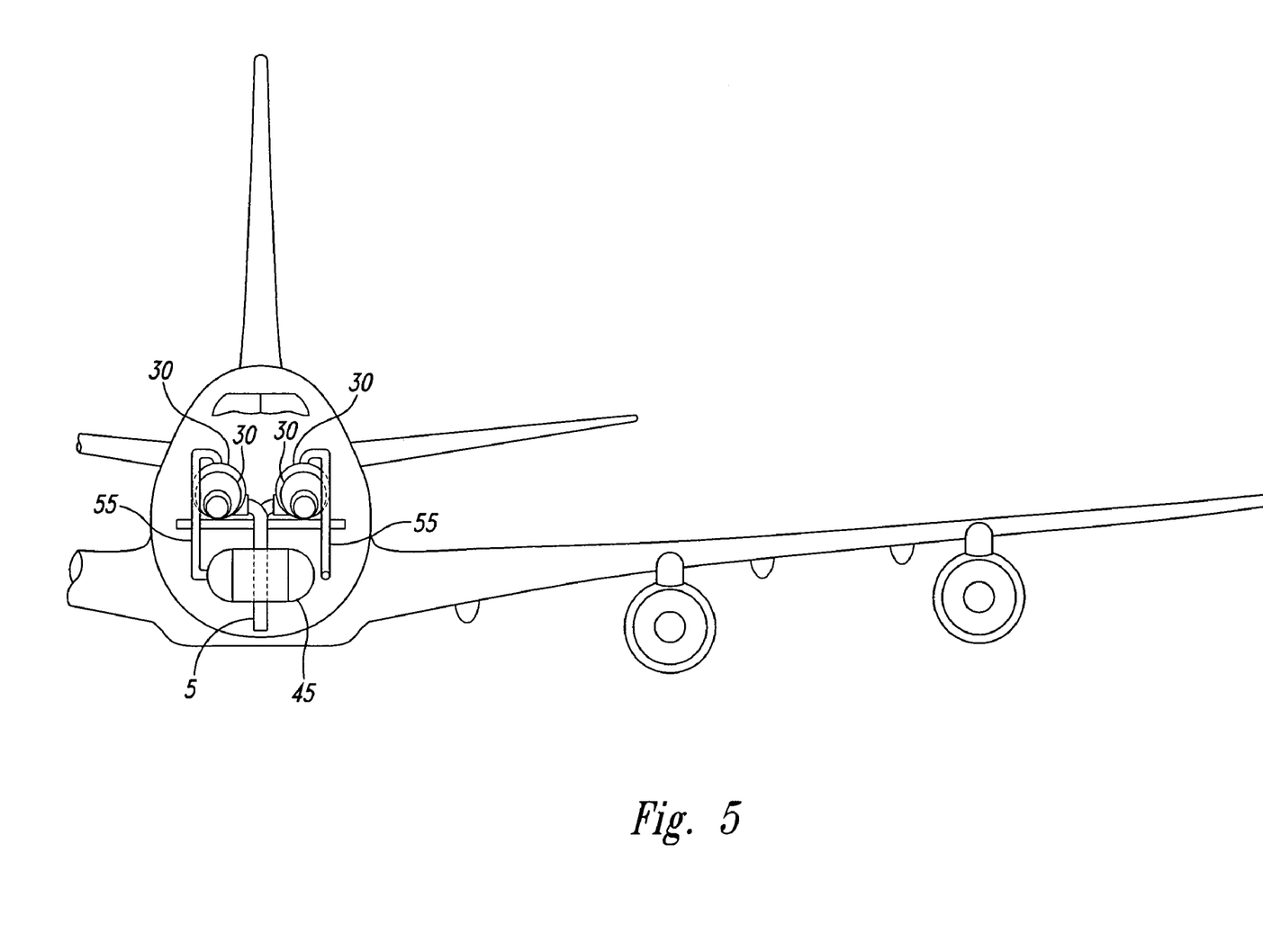
FIG. 5 is a front view of the embodiment of FIG. 3.

As an over-view, the aerial delivery system 1 is attached to an aircraft at the wing box 2. The wing box 2 runs through the lower portion of the fuselage 3 and ties wings 25 into the rest of the aircraft. The majority of the aerial delivery system 1 attaches at the wing box 2, a strong point on the aircraft. As shown in FIGS. 1 and 2, the aerial delivery system 1 includes at least a material storage tank 30 generally longitudinal with the aircraft. With larger aircraft such as the Boeing 747, DC 10, or Airbus 380, generally a plurality of the material storage tanks 30 would be used such as further described below to potentially increase the material carrying capacity of the aircraft while addressing issues regarding maintaining center of gravity of the overall aircraft and its load. In one aspect, the material storage tank 30 may be made of steel. The material storage tank 30 may be located aboard the aircraft. Towards the aft of the aircraft and the aerial delivery system 1 at or about the wing box 2, the material storage tank 30 forms a branching joint 35, such as but not limited to a "T" or "Y" joint, and continues aft as a single tank. As it continues aft, a plurality of pressurized outlets 5, such as nozzles or chutes, extend from the tank 30, directed downward from the bottom side 15 of the aircraft. From these outlets 5, pressurized fluid and/or material can exit. In one aspect, the outlets 5 expel their contents directly downwards.

In one embodiment, the aerial delivery system 1 includes a separation valve 40 located on each material storage tank 30 before merging into the branching joint 35. As an example of this embodiment in use, a first material storage tank 30 merging into the branching joint 35 from the front of the aircraft could carry water while a second material storage tank 30 from the front of the aircraft could carry a chemical activated upon mixing with the water. Upon opening of the separation valves 40, the contents of the two tanks 30 would intermix and be activated. In the single material storage tank 30 from the branching joint 35, the activated mixture is carried aft of the aircraft and released from the outlets 5. This embodiment would be useful to carry compounds which have a short half life and where it would be desirable to mix the components at a time closer to use.

The aerial delivery system 1 has the capability to premix materials, mix materials on-board or disperse two different materials separately. The number of valves controlling the outlets 5 that are opened at any time controls the quantity of material ejected.

The aerial delivery system 1 utilizes one or more air accumulators 45, charged to one or more specific pressures, that propel various materials stored in the material storage tanks 30 various air accumulations 45 can contain air pressurized at different pressures to match requirements of different materials contained in different of the material storage tanks 30. These materials include, but are not limited to, water, gels, powders, chemicals and biological agents used for decontamination, neutralization, weather modification, oil spill treatment and firefighting.

The specific material is directed by pressure in air accumulators 45, and is propelled through dump outlets 5 straight down or at a forward angle away from the aircraft at variable pressures. Ejected material can strike or interact with its intended target either with forward direction or slow into a rain-like state dependent on which pressures and altitudes are used.

The air accumulators 45 have one or more pressure vessel tanks 46 capable of holding high-pressure air. The stored air (energy) is the propulsion system allowing fluid and/or materials to exit the aircraft. The pressure vessel tanks 46 are pressurized with either bleed air from the airplane, air from an onboard compressor or by using the incoming material.

The air accumulators 45 are connected to a high-pressure regulator 50, which will regulate the pressure vessel tank 46 pressure. The high pressure regulator 50 is coupled to the air accumulator 45 that holds large amounts of air at high pressure, so that lower and constant air pressure can be delivered to the material storage tanks 30 via air lines 55 coupled to the lower pressure side of the high pressure regulator.

The material storage tanks 30 are pressure vessels that house the material and/or fluid to be expelled. In one aspect, the material storage tank 30 design consists of two tanks that run longitudinally and join at a branching joint 35, such as in a "Y" or "T" joint. The air lines 55 feed into the forward portion of the material storage tanks 30. The material storage tanks 30 are able to withstand any air pressure delivered from the high-pressure regulator 50. The material storage tanks 30 can be filled by a material fill line (not shown) installed anywhere in either material storage tank 30. This would allow for a division of two separate materials, such as a dormant fire retardant material and an activator material. The dormant fire retardant material and the activator would be admixed close to the time of use.

The aerial delivery system 1 may also include the separation valves 40 for the division of the two separate materials, such as dormant and activator materials. In one aspect, positioned at the aft end of the material storage tank 30 would be a set of two butterfly valves on each side of the branching joint 35 from the two material storage tanks 30 to a dump manifold 70.

The dump manifold 70 is a pressure vessel which serves as not only a connecting point for the materials and/or fluid but a way to divert the material and/or fluid to a lower compartment of a multi-compartment aircraft for discharge. The outlets 5, such as the dump chutes or nozzles, branch out from the dump manifold 70 and act as the exit mechanism for the material and/or fluids. This mechanism includes, but is not limited to, eight butterfly valves which open individually, in combination, or all at once to acquire the desired flow rate. The control and/or operation of the butterfly valves can be by a hydraulic actuator system. Exit locations of the outlets 5, which can be straight pipe sections, exit the belly of aircraft behind the wing box 2. A bellows pressure barrier (not shown) will hook between the fuselage skin and an exit pipe (not shown), allowing the aircraft to maintain cabin pressure. A faring (not shown) will be housed over the exit pipes.

In yet another aspect, a drop controller 85, such as a microprocessor-based computer device, given flow rate and line length, will calculate how many valves to open and at what time to provide exact flow rate management (e.g., levels of coverage, intensity of coverage).

FIGS. 3-5 show another embodiment of the aerial fluid delivery system 1 in conjunction with a large aircraft such as a Boeing 747 (shown in the drawings), DC 10, Airbus 380, or other substantially large aircraft. In this embodiment, since a greater number of the pressure vessel tanks 46 are used, the pressure vessel tanks are positioned transverse to the longitudinal dimension of the fuselage 3. A greater number of material storage tanks 30 are also used and are distributed in port and starboard pairs along the longitudinal direction of the fuselage 3 to better distribute load within the aircraft.

In particular, the material storage tanks 30 are sized in the depicted embodiment such that the forward most pair of tanks (1L and 1R in FIG. 4) are smallest, the second forward pair of tanks (2L and 2R in FIG. 4) are larger, the next two pairs of tanks (3L, 3R and 4L, 4R in FIG. 4) are largest and the aft most pair of tanks (5L and 5R in FIG. 4) are sized similar to the second forward pair of tanks (2L and 2R in FIG. 4). The implementation as depicted in FIGS. 3-5 has the air lines 55 connected to the most forward pair of tanks (1L and 1R in FIG. 4) so that the most forward pair of tanks empties first, then the second forward pair of tanks empties.

Emptying of the tanks continues to following this sequential order from more forward pairs of tanks to more aft pair of tanks until the most aft pair of tanks (5L and 5R) are emptied. This particular order of emptying could be re-ordered depending upon how the pressurized vessel tanks were coupled to the material storage tanks 30 with the air lines 55. Since the depicted implementation of FIGS. 3-5 follows a sequential forward most to aft most order of emptying of the material storage tanks 30, the tanks are sized and positioned occurring to this order of emptying such that the overall center of gravity of the loaded aircraft stays within a forward most center of gravity limit point CGf and an aft most center of gravity limit point CGa.

Figure 6:
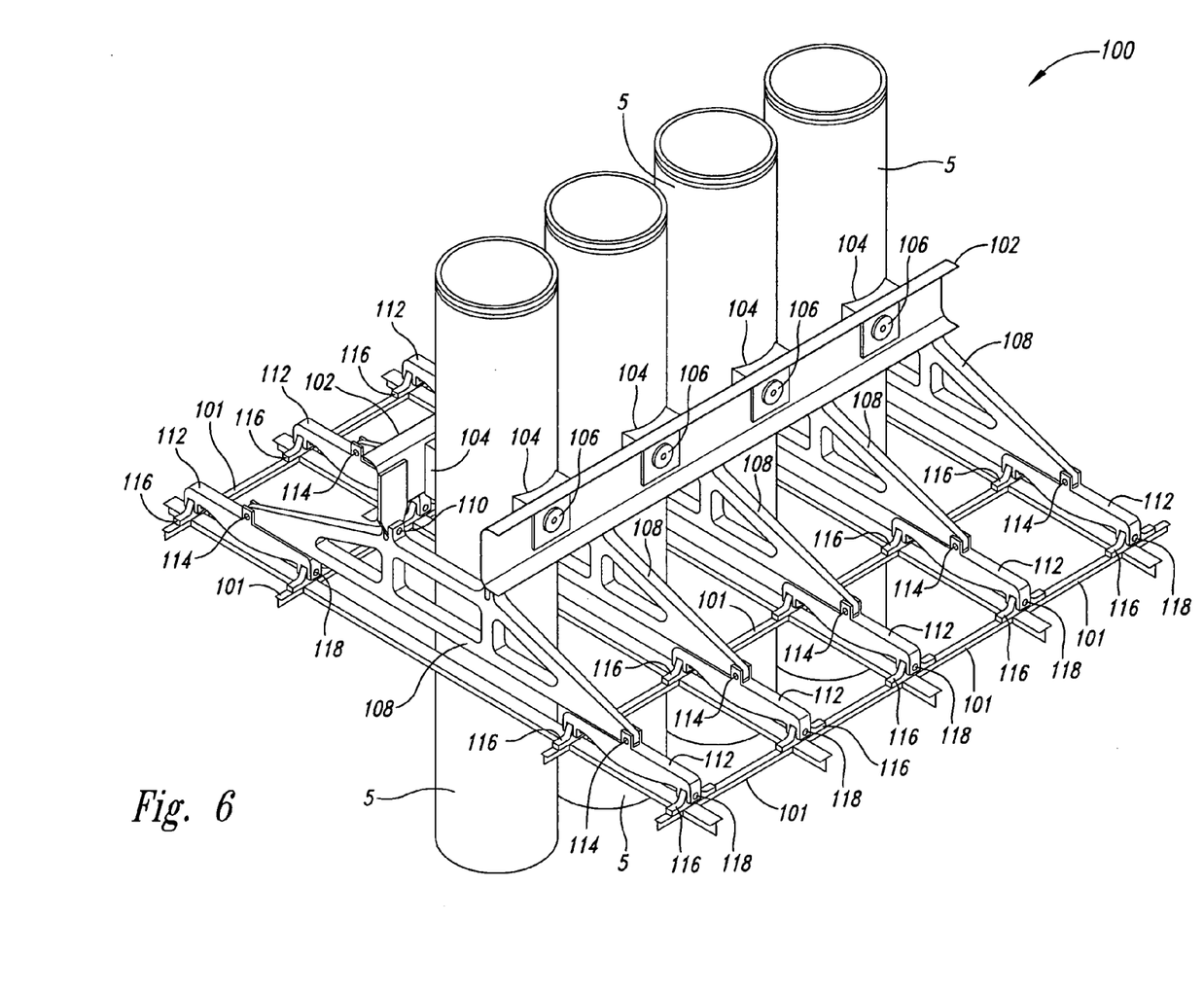
FIG. 6 is an isometric view of an outlet securing system.

In the particular implementation depicted, the center of gravity of the aircraft when the material storage tanks 30 are full is near the forward most center of gravity limit point CGf and is near the aft most center of gravity limit point CGa when the material storage tanks are substantially empty. As shown in FIG. 4, lines for the dump manifold 70 protrude in a direction perpendicular to the longitudinal dimension of the aircraft from the aft most pair (5L and 5R in FIG. 4) of material storage tanks 30, which allows the aft most pair of material storage tanks to be located farther aft in the aircraft relative to the outlets 5 than the first embodiment.

As shown in FIGS. 3 and 4, there exists even more room in the aircraft to locate additional material storage tanks 30 both forward and aft of the material storage tanks shown. If an additional pair of the material storage tanks 30 were located forward of the forward most pair (1L and 1R) of material storage tanks shown and an additional pair of material storage tanks were located aft of the aft most pair (5L and 5R) of material storage tanks shown, the added pairs of tanks would be likely have to be emptied at the same time to maintain an acceptable location for the center of gravity for the aircraft.

It has been found that the sequential ordering of emptying of the material storage tanks 30 starting from the forward most pair and ending at the aft most pair tends to have less complication involved so can tend to have an acceptable level of reliability. Other scenarios involving more complicated ordering of emptying of the various pairs of the material storage tanks 30 may not have an acceptable level of reliability given the influence of emptying of the material storage tanks on the center of gravity of the aircraft. Consequently, when additional factors of safety are desired, it may be necessary to limit the material storage tanks 30 to a number that would allow a more reliable emptying of the tanks such as a sequential forward to aft emptying order rather than using additional storage of the aircraft for additional of the material storage tanks and thereby causing a more complicated emptying order.

As shown in FIG. 3, the outlets 5 are again directed to emit in a downward direction approximately perpendicular to the longitudinal dimension of the fuselage 3. This downward perpendicular direction of emission combined with the pressurized nature of emission is designed to project the contents of the material storage tanks 30 not only past the aircraft and substantially past the aircraft turbulence to a great degree, but also so the contents can be better directed downward toward objects or other targets generally located on that portion of the earth in a vicinity below the aircraft. The outlets 5 are generally located along the longitudinal dimension of the aircraft relatively near the trailing edge (the most aft edge) of the inboard flaps 90 in their extended position. The extended position of the inboard flaps 90 is taken into consideration since the aircraft is generally traveling at reduced speed with the inboard flaps in an extended position at the time of dumping of the content of the material storage tanks 30. It has been found that in this area just aft of the trailing edge of the extended inboard flaps 90 that there is a minimal amount of turbulence to be dealt with. If the outlets 5 are moved forward of the trailing edge of the inboard flaps 90 or moved more aft toward the tail of the aircraft, there can be more turbulence, which can reduce ability to delivery content of the material storage tanks 30 to the ground generally below the aircraft in sufficient concentrations.

It has been also found that using air pressurized in the pressure vessel tanks 46 at over 40 psi, and preferably at over 50 psi and more preferably at or over 65 psi helps to deliver the contents of the material storage tanks 30 to the ground at significantly high levels of concentration. For instance, in test runs, delivery concentrations to the ground as high as 14.8 gallons per square feet have been observed for pressures of 65 psi in the pressure vessel tanks 46 with the positioning and orientation of the outlets 5 as discussed above for drops from the aircraft at 400 feet above the ground.

Use of large aircraft, such as a Boeing 747, affords greater material carrying capacity so that large amounts can be dumped onto substantial areas of land at high concentrations given the configurations described above. To handle large volume deliveries, the outlets 5 are sized with relatively large pipe diameters such as having 16 inch diameters in some implementations. With large pipe diameters for the outlets 5 and substantially high pressure levels for the pressure vessel tanks 46, such as 65 psi, a substantial amount of thrust induced force can result from the material in the material storage tanks 30 being shot out from the large diameter outlets at high pressure. Conventional methods of securing outlets to an aircraft involve common techniques to secure pallets to the aircraft, such as with outer guide locks. Due to the unconventionally high amount of thrust that can result from material being delivered by the aerial delivery system 1, these conventional outlet securing systems and methods can be inadequate in properly distributing the thrust induced load to an adequately sized portion of the aircraft to safely hold the outlets 5 in place without risking structural damage to the aircraft.

An outlet securing system 100 is depicted in FIG. 6 to properly distribute the unconventionally high thrust induced loads to an adequately sized portion of the aircraft. The outlet securing system 100 couples the outlets 5 to the aircraft by coupling to seat tracks 101 originally designed for securing passenger seats to the aircraft when the aircraft is used as a passenger airliner. Coupling the outlets 5 to the aircraft by coupling the outlets to the seat tracks 101 allows for a more secure way of imparting the thrust induced load to the aircraft structure than the conventional methods used involving securing pallets to the aircraft. Consequently, the outlet securing system 100 allows the aerial delivery system 1 to delivery greater quantities of material with air tank pressures substantially higher than used by conventional delivery systems.

As further shown in FIG. 6, the outlet securing system 100 includes brace beams 102 coupled to the outlets 5 with conforming spacers 104 and bolts 106. The brace beams 102 are coupled to frame members 108 with bolts 110. The frame members 108 are in turn coupled to seat track spanning members 112 with bolts 114. The seat track spanning members 112 can be sized to span between two or more of the seat tracks 101. The seat track spanning members 112 are coupled to seat track couplers 116 with bolts 118. The seat track couplers 116 are shaped and fashioned to directly fasten to portions of a plurality of the seat tracks 101 (shown in FIG. 6 as coupling to portions of four of the seat tracks of the aircraft). Although FIG. 6 has depicted a particular structure for the outlet securing system 100, other implementations are also envisioned that involve other configurations of frame members and seat track couplers while retaining a general approach of securing the outlets 5 to portions of one or more of the seat tracks 101 found in the aircraft for enhanced load distribution.

In one aspect, the aerial fluid delivery system is capable of association with an aircraft comprising: an aboard area and an outer area of the aircraft; an air accumulator associated with a plurality of tanks, the air accumulator located in the aboard area of the aircraft, the tanks capable of containing a fluid, the air accumulator capable of propelling the fluid contained in the tanks; a dump manifold associated with the tanks; and a dump valve, the dump valve associated with the dump manifold, wherein the fluid is directed by pressure in the accumulator and is propelled through the dump valve downward from the aboard area of the aircraft.

The aerial fluid delivery system may have the fluid selected from the group consisting of at least a water, gel, decontamination compound, weather modification compound, oil spill treatment compound, and a firefighting compound.

The aerial fluid delivery system may be capable of association with an airplane, helicopter, or balloon.

In another aspect, the aerial fluid delivery system 1 is used with an aircraft having a wing box comprising: an air accumulator, the air accumulator capable of holding high-pressure air; a high pressure line; at least a material holding tank connected to the air accumulator by the high pressure line, the material holding tank having a forward end and an aft end; a high pressure regulator associated with the air accumulator, wherein the high pressure regulator allows the air accumulator to hold large amounts of air at high pressures so low and constant air pressure can be delivered to the material holding tank; at least a separation valve associated with the aft end of the material holding tank; a dump manifold associated with the material holding tank; and a dump outlet associated with the dump manifold, the dump outlets located behind the aircraft wing box, wherein the fluid held within the material holding tank is capable of exiting the system from the dump outlets under propulsion from high pressure air from the air accumulator.

The aerial fluid delivery system may include a faring housed over the dump outlet.

The aerial fluid delivery system may use a pressure vessel tank as the air accumulator.

The aerial fluid delivery system may use the a high pressure vessel as the material holding tank.

The aerial fluid delivery system may further include a second material holding tank, the material holding tank and the second material holding tank being joined to form a branching T joint. Alternatively, the material holding tank, and the second material holding tank may be joined to form a branching Y joint.

The aerial fluid delivery system may use a material holding tank made of steel.

The aerial fluid delivery system may use a butterfly valve as a separation valve.

The separation valve may be located on each side of the branching T joint, or be located on each side of the branching Y joint, depending on which is used.

The aerial fluid delivery system may use a chute as the dump outlet. Or, the dump outlet may be a nozzle.

The aerial fluid delivery system may further include a drop controller.

The aerial fluid delivery system may include a second material holding tank, with the material holding tank and the second material holding tank located generally longitudinal with the aircraft.

The aerial fluid delivery system may use a Boeing 747 aircraft.

The discussion above is descriptive, illustrative and exemplary and is not to be taken as limiting the scope defined by any appended claims.

The invention claimed is:

1. A system for an aircraft having wings with flaps having trailing edges, the flaps having an extended position for relatively slow flight of the aircraft, the aircraft having a fuselage with a longitudinal dimension, the aircraft having a nose and a tail, the nose being forward along the longitudinal dimension of the tail and the tail being aft along the longitudinal dimension of the nose, the aircraft having a longitudinal center of gravity located with respect the longitudinal dimension of the fuselage, the fuselage having a forward most center of gravity point CGf at a particular location along the longitudinal dimension of the fuselage and having an aft most center of gravity point CGa at another particular location along the longitudinal dimension of the fuselage aft of the forward most center of gravity point, the aircraft having performance requirements that dictate that the longitudinal center of gravity remain at or aft of the forward most center of gravity limit point, CGf, and that the longitudinal center of gravity remain at or forward of the aft most center of gravity limit point CGa, the aircraft having a wheel system for ground support of the aircraft, the fuselage having a bottom side configured to be the side of the fuselage nearest to a runway when the aircraft is being supported on the runway by the wheel system, the aircraft having a plurality of seat tracks configured to be removably coupled to passenger seats to secure the passenger seats to the aircraft when the passenger seats are coupled to the seat tracks, the system comprising:

a plurality of material tanks configured to each contain material, the plurality of material tanks located inside the fuselage of the aircraft, at least one of the plurality of material tanks located aft along the longitudinal dimension of the fuselage of another one of the plurality of material tanks;

at least one pressurized tank configured to contain a gas under pressure of at least 50 pounds per square inch (p.s.i.), the at least one pressurized tank coupled to the plurality of material tanks such that the gas when released from the pressurized tank assists in releasing material from containment within each of the plurality of material tanks; and a plurality of outlets coupled to the material tanks, the outlets extending from inside the fuselage and through the bottom side of the aircraft in a direction approximately perpendicular to the longitudinal dimension of the fuselage, the outlets configured to conduct material released from containment within the plurality of material tanks to be projected outside the fuselage of the aircraft in a direction approximately perpendicular to the longitudinal dimension of the fuselage, the outlets coupled to portions of at least some of the plurality of seat tracks of the aircraft to secure the outlets to the aircraft and sufficiently distributing thrust loads to the aircraft resulting from projection of the material through the outlets outside of the fuselage of the aircraft, the outlets approximately located along the longitudinal dimension of the fuselage immediately aft of the longitudinal location of the trailing edge of at least a pair of the flaps when the at least a pair of the flaps are in their extended position, the at least one pressurized tank and the material tanks so sized and positioned within the fuselage such that the longitudinal center of gravity is located at or between the forward most center of gravity limit point, CGf and the aft most center of gravity limit point CGa along the longitudinal dimension of the fuselage as the at least one pressurized tank releases the gas into the material tanks and as the material tanks empty in the predetermined order.

2. The system of claim 1 wherein the material tanks are configured to contain material selected from the group consisting of at least a water, gel, decontamination compound, weather modification compound, oil spill treatment compound, and a firefighting compound.

3. A system for an aircraft having wings, the aircraft having a fuselage with a longitudinal dimension, the aircraft having a nose and a tail, the nose being forward along the longitudinal dimension of the tail and the tail being aft along the longitudinal dimension of the nose, the aircraft having a wheel system for ground support of the aircraft, the fuselage having a bottom side configured to be the side of the fuselage nearest to a runway when the aircraft is being supported on the runway by the wheel system, the aircraft having a plurality of seat tracks configured to be removably coupled to passenger seats to secure the passenger seats to the aircraft when the passenger seats are coupled to the seat tracks, the system comprising:
a material tank configured to contain material and located inside the fuselage of the aircraft;
a pressurized tank configured to contain a pressurized gas, the pressurized tank so coupled to the material tank that the pressurized gas, when released from the pressurized tank, assists in releasing material from containment by the material tank; and
a plurality of outlets extending from inside the fuselage through the bottom side of the aircraft and so coupled to the material tank to receive material from containment by the material tank and to project the released material outside of the fuselage of the aircraft, the outlets coupled to portions of at least some of the plurality of seat tracks of the aircraft to secure the outlets to the aircraft and sufficiently distributing thrust loads to the aircraft resulting from projection of the material through the outlets outside of the fuselage of the aircraft.

4. A system comprising:
an aircraft having wings, the aircraft having a fuselage with a longitudinal dimension, the aircraft having a nose and a tail, the nose being forward along the longitudinal dimension of the tail and the tail being aft along the longitudinal dimension of the nose, the aircraft having a wheel system for ground support of the aircraft, the fuselage having a bottom side configured to be the side of the fuselage nearest to a runway when the aircraft is being supported on the runway by the wheel system, the aircraft having a plurality of seat tracks configured to be removably coupled to passenger seats to secure the passenger seats to the aircraft when the passenger seats are coupled to the seat tracks;
a material tank configured to contain material and located inside the fuselage of the aircraft;
a pressurized tank configured to contain a pressurized gas, the pressurized tank so coupled to the material tank that the pressurized gas, when released from the pressurized tank, assists in releasing material from containment by the material tank; and
a plurality of outlets extending from inside the fuselage through the bottom side of the aircraft and so coupled to the material tank to receive material from containment by the material tank and to project the released material outside of the fuselage of the aircraft, the outlets coupled to portions of at least some of the plurality of seat tracks of the aircraft to secure the outlets to the aircraft and sufficiently distributing thrust loads to the aircraft resulting from projection of the material through the outlets outside of the fuselage of the aircraft.

5. A system for an aircraft having wings, the aircraft having a fuselage with a longitudinal dimension, the aircraft having a nose and a tail, the nose being forward along the longitudinal dimension of the tail and the tail being aft along the longitudinal dimension of the nose, the aircraft having a wheel system for ground support of the aircraft, the fuselage having a bottom side configured to be the side of the fuselage nearest to a runway when the aircraft is being supported on the runway by the wheel system, the aircraft having a plurality of seat tracks configured to be removably coupled to passenger seats to secure the passenger seats to the aircraft when the passenger seats are coupled to the seat tracks, the system comprising:
a material tank configured to contain material and located inside the fuselage of the aircraft; and
a plurality of outlets extending from inside the fuselage through the bottom side of the aircraft and so coupled to the material tank to receive material from containment by the material tank and to project the released material outside of the fuselage of the aircraft, the outlets coupled to portions of at least some of the plurality of seat tracks of the aircraft to secure the outlets to the aircraft and distribute thrust loads to the aircraft resulting from projection of the material through the outlets outside of the fuselage of the aircraft.

* * * * *